(12) United States Patent
Singh et al.

(10) Patent No.: US 10,664,594 B2
(45) Date of Patent: May 26, 2020

(54) ACCELERATED CODE INJECTION DETECTION USING OPERATING SYSTEM CONTROLLED MEMORY ATTRIBUTES

(71) Applicant: Microsoft Technology Licensing, LLC, Redmond, WA (US)

(72) Inventors: Abhishek Kumar Singh, Bellevue, WA (US); Aditya Joshi, Redmond, WA (US); Freddie L. Aaron, Bothell, WA (US); Peter A. Loveless, Issaquah, WA (US); Tino Morenz, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 104 days.

(21) Appl. No.: 15/640,192

(22) Filed: Jun. 30, 2017

(65) Prior Publication Data

US 2019/0005236 A1 Jan. 3, 2019

(51) Int. Cl.
| | |
|---|---|
| *G06F 12/00* | (2006.01) |
| *G06F 21/56* | (2013.01) |
| *G06F 12/14* | (2006.01) |
| *G06F 21/79* | (2013.01) |
| *G06F 12/1009* | (2016.01) |

(52) U.S. Cl.
CPC .......... *G06F 21/56* (2013.01); *G06F 12/1441* (2013.01); *G06F 21/566* (2013.01); *G06F 21/79* (2013.01); *G06F 12/1009* (2013.01); *G06F 2212/1052* (2013.01); *G06F 2221/033* (2013.01)

(58) Field of Classification Search
None
See application file for complete search history.

(56) References Cited

U.S. PATENT DOCUMENTS

| | | | |
|---|---|---|---|
| 7,506,374 B2 | 3/2009 | Carmona | |
| 8,387,139 B2 | 2/2013 | Jarrett et al. | |
| 9,135,443 B2 | 9/2015 | Ramchetty et al. | |
| 9,372,989 B2 | 6/2016 | Grystan et al. | |

(Continued)

OTHER PUBLICATIONS

Kolbitsch, et al., "Effective and Efficient Malware Detection at the End Host", In Proceedings of the 18th conference on USENIX security symposium, Aug. 10, 2009, 16 pages.

(Continued)

*Primary Examiner* — Midys Rojas
(74) *Attorney, Agent, or Firm* — Fiala & Weaver P.L.L.C.

(57) ABSTRACT

Methods for accelerated code injection detection using operating system controlled memory attributes are performed by systems and apparatuses. The methods optimize search operations for memory segments in system and virtual memories by searching for segment attributes. A set of memory segments is determined wherein each memory segment in the set includes specific attributes. The memory segments in the set are ranked for a threat level based on segment attribute. The threat level is used to determine subsequent actions including providing indications of the memory segments in the set and initiating execution of an anti-malware application. Relevant segment attributes used for the segment search can be dynamically updated in an attribute list. Segment attributes of a segment can be determined by accessing a memory manager of an operating system via an API.

20 Claims, 6 Drawing Sheets

(56) References Cited

U.S. PATENT DOCUMENTS

| | | | |
|---|---|---|---|
| 2006/0265749 | A1 | 11/2006 | Kwon et al. |
| 2008/0016339 | A1 | 1/2008 | Shukla |
| 2014/0157366 | A1 | 6/2014 | Ko et al. |
| 2016/0378979 | A1 | 12/2016 | Kapoor et al. |
| 2017/0155676 | A1* | 6/2017 | Tamir .................. G06F 21/50 |

OTHER PUBLICATIONS

Ligh, et al., "The Art of Memory Forensics: Detecting Malware and Threats in Windows, Linux, and Mac Memory", In Book of The Art of Memory Forensics: Detecting Malware and Threats in Windows, Linux, and Mac Memory, Jul. 11, 2014, 914 Pages.

"International Search Report and Written Opinion Issued in PCT Application No. PCT/US2018/035247", dated Aug. 17, 2018, 12 Pages.

* cited by examiner ns is difficult. With the advent of large virtual memories in x64
ACCELERATED CODE INJECTION DETECTION USING OPERATING SYSTEM CONTROLLED MEMORY ATTRIBUTES

BACKGROUND

The sophistication of malware attacks and malware code persistence continues to increase. For instance, injected malware code that executes in a legitimate process on a system is difficult to detect. One reason for this is that injected malware code has a minimal, or no, disk footprint during operation of the infected system. That is, injected malware code may reside completely, or almost completely, in the memory of the system during operation, instead of residing on other non-volatile storage devices such as hard drives. Malware injection may include reflective injection, shellcode, stripped MZ headers, obfuscated payloads, and/or the like.

Injected malware code detection often requires scanning the large address space of a process memory as well as searching and emulation over those memory regions. In state of the art systems, such as those with 64-bit operating systems, system memory and virtual memory spaces may be a few gigabytes (GB) to tens or hundreds of terabytes (TB) or more in size. Scanning and analyzing such large address spaces requires significant time and system resources, and analysis resources commodities often have constraints used to enforce a balance between efficiency/cost and effectiveness. With the advent of large virtual memories in x64 systems, effectively scaling for scanning and analyzing resources is difficult.

SUMMARY

This Brief Summary is provided to introduce a selection of concepts in a simplified form that are further described below in the Detailed Description. This Brief Summary is not intended to identify key features or essential features of the claimed subject matter, nor is it intended to be used to limit the scope of the claimed subject matter.

Methods for accelerated code injection detection using operating system controlled memory attributes are performed by systems and apparatuses. For example, methods may be performed in server computers and/or in computing devices of users, and in embodiments, the server computers and computing devices may be communicatively coupled together, e.g., over a network. The methods enable efficient search operations for memory segments in system and virtual memories by searching for segment attributes. A set of memory segments is determined wherein each memory segment in the set includes specific attributes. The memory segments in the set are ranked for a threat level based on segment attribute. The threat level is used to determine subsequent actions including providing indications of the memory segments in the set and initiating execution of an anti-malware application. The segment attributes used for the segment search can be dynamically updated and can be determined by accessing the memory manager of an operating system via an application programming interface (API).

In one example, a method is provided. The method may be performed for accelerated code injection detection using operating system controlled memory attributes, as described herein. The method may also be for malware detection that is implemented by a computing system. In embodiments, the method includes searching a memory to locate the memory segments contained within. The method also includes determining memory segments of the located memory segments that have a predetermined plurality of segment attributes. The memory segments having the predetermined segment attributes are used to determine a set of memory segments. The method also includes enabling the determined set of memory segments to be scanned for malware code instead of scanning all the located memory segments.

In another example, a system is provided. The system may be configured in various ways to perform accelerated code injection detection using operating system controlled memory attributes, as described herein. The system includes a memory(ies) configurable to define a plurality of memory segments, and configured to store instructions associated with processes executing on the system, and program logic for malware search and detection. The system also includes a processor(s) configured to access the memory and to execute the program logic. The program logic includes search logic configured to search the at least one memory to locate memory segments. The system also includes attribute logic configured to determine memory segments of the located plurality of memory segments having a first segment attribute to determine a first set of memory segments, and to determine memory segments of the first set that also have a second segment attribute to determine a second set of memory segments. The system also includes indication logic configured to provide an indication to enable the second set of memory segments to be scanned for malware code instead of scanning the plurality of memory segments for malware code.

In still another example, a computer-readable program storage device has computer program instructions recorded thereon that, when executed by a processing device, performs a method for malware detection. The method may be for accelerated code injection detection using operating system controlled memory attributes, as described herein. The program instructions include search instructions configured to search a memory of a system, and locate memory segments of the memory. The program instructions also include attribute instructions configured to determine memory segments of the located memory segments having a predetermined plurality of segment attributes to determine a set of memory segments that contains fewer memory segments than the located memory segments. The program instructions also include indication instructions configured to provide an indication to enable the set of memory segments to be scanned for malware code instead of scanning the plurality of memory segments for malware code. In some embodiments, the predetermined plurality of segment attributes may include two, three, or more segment attributes that may be related to each other.

These and other objects, advantages and features will become readily apparent in view of the following detailed description of examples of the invention. Note that the Brief Summary and Abstract sections may set forth one or more, but not all examples contemplated by the inventor(s). Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate examples of the present application and, together with the description, further explain the principles of the example embodiments and to enable a person skilled in the pertinent art to make and use the example embodiments.

Figure 1:
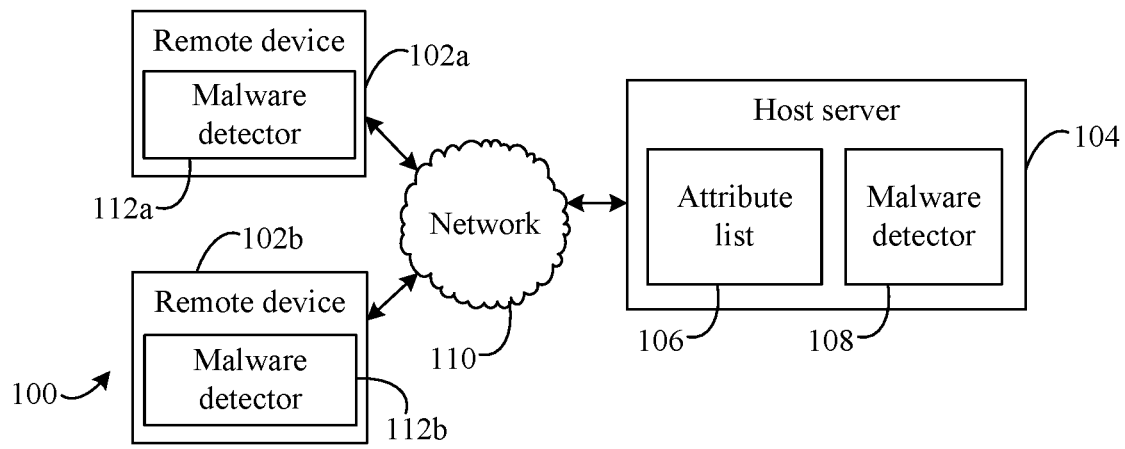
FIG. 1 shows a block diagram of a networked system for accelerated code injection detection using operating system controlled memory attributes, according to an example embodiment.

The features and advantages of the examples described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous embodiments. The scope of the present patent application is not limited to the disclosed embodiments, but also encompasses combinations of the disclosed embodiments, as well as modifications to the disclosed embodiments.

References in the specification to "one embodiment," "an example embodiment," "an example," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Numerous embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Section II below describes example embodiments for accelerated code injection detection using operating system controlled memory attributes.

Section III below describes an example processor-based computer system that may be used to implement features of the example described herein.

Section IV below describes some additional examples and advantages.

Section V provides some concluding remarks.

II. Example Embodiments

The example techniques and embodiments described herein are provided for illustrative purposes, and are not limiting. The embodiments described herein may be adapted to any type of electronic and/or processing device, as well as systems thereof. Further structural and operational embodiments, including modifications/alterations, will become apparent to persons skilled in the relevant art(s) from the teachings herein.

The techniques and embodiments described herein provide for accelerated code injection detection using operating system controlled memory attributes. In the context of memories for computing systems, e.g., 64-bit computing systems, there are certain in-memory behaviors that are controlled by an attacker using malware, and certain behaviors that are controlled by the operating system (OS). The described techniques and embodiments utilize this OS-controlled behavior to improve memory searches and analytics of detecting malware, including dynamic code injection-type of malware that persists in volatile memories and not on-disk.

For instance, an OS may strictly control different kinds of attributes for memory segments in a memory that represent the behavior of memory segments and how a page is associated with physical memory. These OS-controlled attributes may not change for a given segment thus providing stable criteria for optimized memory searches and analytics of detecting malware. As an example, a memory segment may have a file backup attribute or "commit" attribute (i.e., the memory segment has committed pages for which physical storage has been allocated, either in memory or in a paging file on-disk). As another example, an execute protection attribute for memory segments indicates executable code in the memory segment. As yet another example, a memory segment may have a type attribute, governed by the OS. The type may indicate the memory segment has an "image" property (i.e., the memory pages within the region are mapped into the view of an image section), that the memory segment has a "mapped" property (i.e., the memory pages within the region are mapped into the view of a section), or that the memory segment has a "private" property (i.e., the memory pages within the region are private to a process and not shared by other processes).

Certain OS method calls set particular attributes/properties on memory segments. For example, a virtual allocation function for virtual memory (that reserves, commits, or changes the state of a region of memory within the virtual address space of a specified process) or a memory allocation API method call may set the private attribute for the given memory segment. A load library or a create file mapping method call may set the image or mapped property respectively for a given segment. In embodiments, using OS-controlled properties, such as those noted herein, a malware detector can more accurately choose to scan or skip scanning a memory segment because of the inferred nature of the memory segment properties.

As noted above, injected malware code has a minimal, or no, disk footprint during operation of the infected system. That is, injected malware code may reside almost completely, or completely, in the memory of the system during operation, instead of residing on other non-volatile storage devices such as hard drives. This may be accomplished by attackers through the injection into memory of foreign shell code via exploitation (e.g., through remote code execution in which network-delivered packets store instruction on the stack or in the heap) or by inducing a user to click on or execute online content to allow access to the memory where malicious code is stored. Injection can be achieved either by allocating new memory or writing the shell code over the existing code pages (e.g., finding a writable code page (i.e., a Read Write Execute Page) or writing to a data page (i.e., with Read Write Protection)), and then converting the page to an executable page. Such malicious code that resides only in memory is capable of evading disk scans by anti-malware applications, and full memory scans are time and resource intensive which results in degraded scan quality to increase scan speed.

The embodiments described herein provide for improved malware detection. In embodiments, memory segments are located in virtual memory and cumulatively checked for segment attributes. For instance, only located memory segments with one of a specific group of first attributes are checked for a second attribute, only memory segments also having the second attribute may be checked for a third attribute, etc. By utilizing specific segment attribute groupings, as described herein, a set of final candidate memory segments that is smaller (e.g., orders of magnitude smaller) than the total set of memory segments in the memory, may be checked for malware presence. The determination of a malware presence may also be enhanced by performing additional observations for the set of final candidate memory segments, as described herein.

Accordingly, systems, apparatuses, and devices may be enabled in various ways for accelerated code injection detection using operating system controlled memory attributes. For example, FIG. 1 is a block diagram of a system 100, according to embodiments. System 100 may be a computing system for accelerated code injection detection using operating system controlled memory attributes, according to an embodiment. As shown in FIG. 1, system 100 includes a remote device 102a, a remote device 102b, and a host server 104, which may communicate with each other over a network 110. It should be noted that the number of remote devices and host servers of FIG. 1 is exemplary in nature, and more or fewer of each may be present in various embodiments.

Remote device 102a, remote device 102b, and host server 104 are configured to be communicatively coupled via network 110. Network 110 may comprise any type of connection(s) that connects computing devices and servers such as, but not limited to, the Internet, wired or wireless networks and portions thereof, point-to-point connections, local area networks, enterprise networks, and/or the like.

Host server 104 may comprise one or more server computers, which may include one or more distributed or "cloud-based" servers. Host server 104 is configured to receive user-selected content and/or content information from remote device 102a and/or remote device 102b via network 110. As illustrated, host server 104 includes an attribute list 106 and a malware detector 108. In embodiments, host server 104 is configured to provide attribute list 106 to remote device 102a and/or remote device 102b via network 110. Host server 104 is also configured to activate malware detector 108, as described below, to enable components thereof to perform accelerated code injection detection using operating system controlled memory attributes at host server 104 and/or remotely at remote device 102a and/or remote device 102b via network 110, according to embodiments.

Remote device 102a and remote device 102b may be any type of computing device or computing system, including a terminal, a personal computer, a laptop computer, a tablet device, a smart phone, etc., that may be used to execute software applications and user interfaces, as well as the malware detector techniques and embodiments described herein. For instance, as shown in FIG. 1, remote device 102a includes a malware detector 112a, and remote device 102b includes a malware detector 112b. Remote device 102a and remote device 102b are configured to respectively activate malware detector 112a and malware detector 112b locally, as described below, to enable components thereof to perform accelerated code injection detection using operating system controlled memory attributes. In embodiments, remote device 102a and/or remote device 102b may include an instance of attribute list 106.

As noted above, malware detector 108, malware detector 112a, and malware detector 112b (collectively referred to herein as "malware detectors") are configured to perform accelerated code injection detection. In embodiments, the code injection may be injectable malware code that is inserted into a memory by a malware program and/or a malicious third-party entity. The malware detectors described herein are configured to determine a set of memory segments of a memory with attributes indicative of an injectable malware code presence. The determined set of memory segments can be indicated, e.g., to a user or administrator, and rather than all memory segments of the memory being scanned for the malware presence, the determined set of memory segments may be scanned by an anti-malware application.

Attribute list 106 is configured to store a list of memory segment attributes that may be utilized by malware detectors, e.g., malware detector 108, malware detector 112a, and malware detector 112b, to determine the set of memory segments of a memory with attributes indicative of an injectable malware code presence. Attribute list 106 may be maintained at host server 104 and provided to remote device 102a and/or remote device 102b for use with the described malware detectors, according to embodiments. In other embodiments, attribute list 106 may be stored and maintained at any or all of host server 104, remote device 102a, or remote device 102*b*. The memory segment attributes of attribute list 106 may be updated, e.g., dynamically at any time.

Accordingly, remote device 102*a*, remote device 102*b*, and/or host server 104 are configured to utilize malware detector 108 and attribute list 106 for accelerated code injection detection using operating system controlled memory attributes. Remote device 102*a*, remote device 102*b*, and host server 104 may be configured in various ways to perform these functions.

Figure 2:
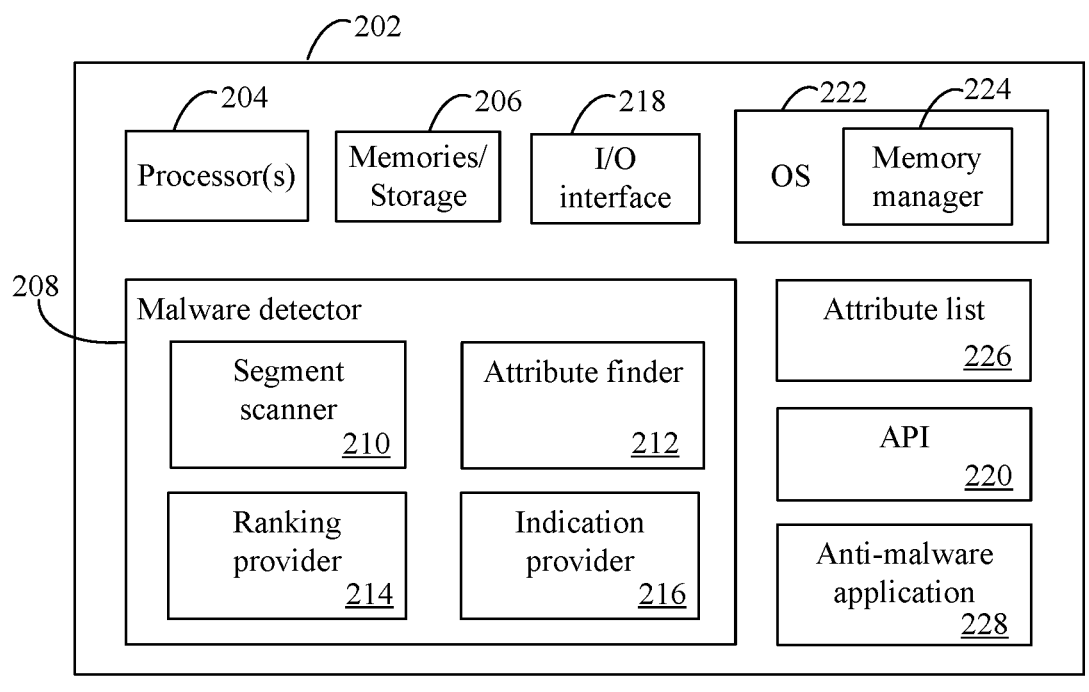
FIG. 2 shows a block diagram of a computing system for accelerated code injection detection using operating system controlled memory attributes, according to an example embodiment.

For instance, FIG. 2 is a block diagram of a system 200, according to an embodiment. System 200 may be a computing system for accelerated code injection detection using operating system controlled memory attributes, in embodiments. As shown in FIG. 2, system 200 includes a computing device 202 which may be referred to as a computing system. System 200 may be a further embodiment of system 100 of FIG. 1, and computing device 202 may be a further embodiment of host server 104, remote device 102*a*, and/or remote device 102*b* of FIG. 1. Computing device 202 may be any type server computer or computing device, as mentioned elsewhere herein, or as otherwise known. As shown in FIG. 2, computing device 202 includes one or more of a processor ("processor") 204, one or more of a memory and/or other physical storage device ("memory") 206, an input/output (I/O) interface 218, an operating system (OS) 222, and a malware detector 208 which may be a further embodiment malware detector 108, malware detector 112*a*, and/or malware detector 112*b* of FIG. 1. System 200 may also include an attribute list 226, which may be a further embodiment of attribute list 106 of FIG. 1, an API component 220, and an anti-malware application 228. System 200 may also include additional components (not shown for brevity and illustrative clarity) such as, but not limited to, those described below with respect to FIG. 10.

Processor 204 and memory 206 may respectively be any type of processor circuit or memory that is described herein, or as would be understood by a person of skill in the relevant art(s) having the benefit of this disclosure. Processor 204 and memory 206 may each respectively comprise one or more processors or memories, different types of processors or memories, and/or distributed processors or memories. Processor 204 is configured to execute computer program instructions such as but not limited to embodiments of malware detector 208, e.g., as computer program instructions for accelerated code injection detection using operating system controlled memory attributes, etc., as described herein, and memory 206 is configured to store such computer program instructions, as well as to store other information and data described in this disclosure, including but without limitation, attribute list 226.

I/O interface 218 may be any type of wired and/or wireless network adapter, modem, etc., configured to allow computing device 202 to communicate with other devices over a network, e.g., such as communications between host server 104, remote device 102*a* and/or remote device 102*b* described above with respect to FIG. 1.

OS 222 that may be any operating system used by computing devices described herein such as, but without limitation, Microsoft® Windows® from Microsoft Corporation of Redmond, Wash., OS X® from Apple, Inc. of Cupertino, Calif., UNIX® from The Open Group, and/or the like. In embodiments, OS 222 may be accessed by a remote device or host server via a network connection to a server (e.g., remote devices 102*a*/102*b* and/or host server 104) where such devices operate as workstations or terminals, and/or the like.

As illustrated in FIG. 2, OS 222 includes a memory manager 224, according to embodiments. Memory manager 224 may comprise management portions in a kernel of OS 222 to manage system and virtual memory of memory 206. In embodiments, memory manager 224 is configured to track memory segments in memory 206, and may include a virtual address descriptor (VAD) tree for processes running on processor 204, that may be a binary tree used for optimized searching via the kernel of OS 222.

Attribute list 226 is configured to store a list of memory segment attributes that may be utilized by malware detector 208 to determine the set of memory segments of a memory with attributes indicative of an injectable malware code presence. The memory segment attributes of attribute list 226 may be updated, e.g., dynamically at any time, and may include memory segment attributes. As contemplated herein, memory segment attributes may include initial candidate criteria, such as address ranges in memory for memory segments (e.g., ranges in memory not used by the kernel). Memory segment attributes may also include first segment attributes such as memory segment types, including but without limitation, a private type (e.g., private memory segment pages specific to a local application or process and not shared) and/or an image type (e.g., a segment object mapped in virtual memory). Memory segment attributes may also include second segment attributes or extended attributes, including but without limitation, an executable space and/or execution locks or protection, as well as shared/not shared designations for memory segments with respect to executing processes and/or applications (e.g., a shared segment attribute may indicate true if shared or false if not shared).

In embodiments, attribute list 226 may also include a list of potential observations that would indicate malicious activity, including but not limited to, functions called, functions available, registry references, an address range of a memory segment in which information/code was modified, system component accesses, privileges/privilege levels, and/or the like. For instance, certain functions and/or calls of functions may indicate a malware presence for memory segments and/or memory segments having various attributes. Likewise, registry references, privileges/privilege levels, and/or system component accesses may also indicate a malware presence. Additionally, ranges of addresses in a memory segment may indicate usage by non-system resources indicative of malware behaviors.

Attribute list 226 may have any suitable form, including that of a data structure such as a file, a database table, an array, etc.

Malware detector 208, as illustrated, includes a plurality of components for performing the techniques described herein for accelerated code injection detection using operating system controlled memory attributes. As shown, malware detector 208 includes a segment scanner 210, an attribute finder 212, a ranking provider 214, and an indication provider 216. While shown separately for illustrative clarity, in embodiments, one or more of segment scanner 210, attribute finder 212, ranking provider 214, and/or indication provider 216 may be included together with each other and/or as a part of other components of system 200.

API component 220 may comprise one or more APIs configured to interface with memory manager 224 and expose memory manager 224 to malware detector 208. For example, API component 220 may be configured to interface with memory manager 224 such that malware detector 208 can obtain information and/or memory segment attributes for memory segments of a memory managed by memory manger 224. In embodiments, API component 220 may be utilized and/or invoked by one or more components of the malware detectors in the systems (e.g., system 100 of FIG. 1 and/or system 200 of FIG. 2) described herein, such as segment scanner 210, attribute finder 212, ranking provider 214, etc. It should also be noted that API component 220 may be invoked by applications and components of systems external to malware detector 208, according to the embodiments and techniques described herein.

Figure 3:
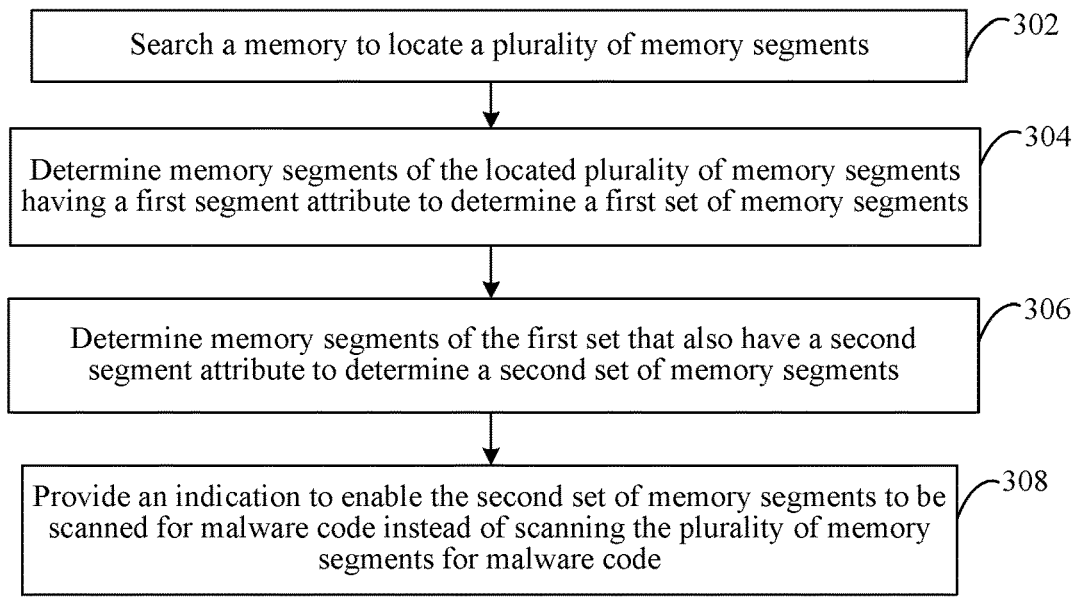
FIG. 3 shows a flowchart for accelerated code injection detection using operating system controlled memory attributes, according to an example embodiment.

Referring also now to FIG. 3, a flowchart 300 for accelerated code injection detection using operating system controlled memory attributes is shown, according to an example embodiment. For purposes of illustration, flowchart 300 of FIG. 3 is described with respect to system 200 of FIG. 2 and its subcomponents, and also with reference to FIG. 4 (described below). That is, system 200 of FIG. 2 may perform various functions and operations in accordance with flowchart 300 for malware detection. Further structural and operational examples will be apparent to persons skilled in the relevant art(s) based on the following description.

Figure 4:
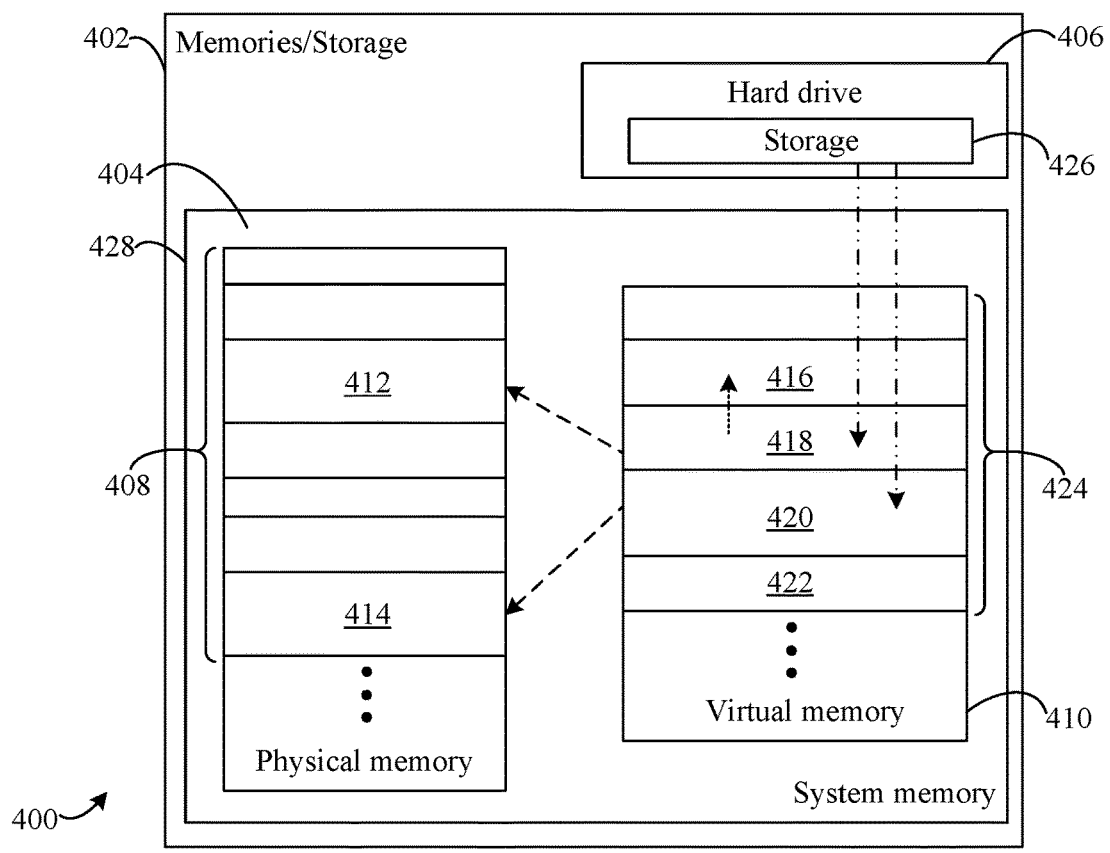
FIG. 4 shows a block diagram of a memory system for accelerated code injection detection using operating system controlled memory attributes, according to an example embodiment.

System 200 of FIG. 2 and flowchart 300 of FIG. 3 are described with reference to FIG. 4. In FIG. 4, a block diagram is shown of a memory system 400 for which accelerated code injection detection using operating system controlled memory attributes may be performed, according to an example embodiment. Memory system 400 includes memories/storage 402. In embodiments, memories/storage 402 may be a further embodiment of memory 206 of FIG. 2. That is, memories/storage 402 may comprise various types of memories and storage devices in a system such as system 200 of FIG. 2.

For instance, memories/storage 402 includes a system memory 428 and a hard drive 406. Hard drive 406 may be any type of hard drive contemplated herein having any storage capacity. Note that embodiments are applicable to other forms of physical storage in addition to or alternatively to hard drive 406.

System memory 428 may comprise system random access memory (RAM) and/or the like, as described herein. System memory 428 is illustrated as including a physical memory 404, and as including a virtual memory 410, described below. Physical memory 404 is configurable as a plurality of memory segments 408, as would be understood by persons of skill in the relevant art(s) having the benefit of this disclosure. While memory segments 408 are illustrated in an exemplary, non-limiting configuration and number, any size and/or number of memory segments 408 are contemplated herein according to the limitations and capabilities of a given system. As contemplated herein, system memory 404 may be of a size of any value, such as but not limited to, 1 GB, 2 GB, 4 GB, 8 GB, 16 GB, etc.

One or more of memory segments 408 may be mapped to space of virtual memory 410. Virtual memory 410 may be of a size of any value, such as but not limited to, ranges of 2 GB to 8 TB, and beyond, within the limitations and capabilities of a given system. Additionally, each memory segment, as illustrated, of memory segments 408 may comprise one or more memory segments 1 megabyte (MB) in size, according to some embodiments, but are shown as single blocks for illustrative clarity and brevity of description. The mapping and management physical memory segments 408 of physical memory 404 to virtual memory segments 424 of virtual memory 410 may be performed by memory manager 224 of FIG. 2. As illustrated for ease of description, and by way of limitation, a memory segment 412 is mapped to virtual address space 418, and a memory segment 414 is mapped to virtual address space 420. Physical memory segments 408 of physical memory 404 may be smaller than, equal to, or greater than corresponding virtual memory segments 424 of virtual memory 410, in different embodiments.

Memory segment 418 and memory segment 420 are illustrated has having been loaded from a storage 426 (e.g., a secondary storage) into virtual memory 410. Memory segment 416 is shown as a copy of memory segment 418 prior to memory segment 418 being modified by an executing process or application corresponding to memory segment 412.

Memory segment 422 is illustrated as being "in memory" only, and not loaded from storage 426. That is, memory segment 422 does not have a file backup in storage 426. Memory segments having an absence of a file backup may be placed into virtual memory 410 by a system or OS process, by an external application, via a network connection, that places items on the stack or the heap, etc.

Flowchart 300 of FIG. 3 is described as follows. In particular, in step 302, a memory is searched to locate a plurality of memory segments. For instance, as noted above, memory 206 of FIG. 2 may comprise a system memory such as system memory 428, as well as physical memory 404 and/or a virtual memory 410 as in FIG. 4 that include memory segments 408 and memory segments 424, respectively. These memory segments may be associated with processes and applications for system 200, such as those executing on system 200. According to embodiments, segment scanner 210 is configured to search or scan virtual memory 410 to locate and/or identify memory segments 424. Segment scanner 210 may be configured to perform this function by scanning/searching virtual memory 410 from byte zero to the highest address of virtual memory 410, although other search methods are contemplated herein as would be understood by persons of skill in the relevant art(s) having the benefit of this disclosure.

In embodiments, segment scanner 210 may be configured to locate and/or identify memory segments such as ones of memory segments 424 by identifying memory segment boundaries and/or according to segment size attributes. Segment scanner 210 may be configured to locate and/or identify memory segments via memory manager 224 an API of API component 220. For instance, memory manager 224 may be configured to manage virtual memory 410 and may be exposed via an API to provide access to segment scanner 210 for locating and/or identifying memory segments, e.g., memory segments 424.

In step 304, memory segments of the located plurality of memory segments are determined as having a first segment attribute to determine a first set of memory segments. For example, attribute finder 212 of FIG. 2 may be configured to determine if given memory segments of memory segments 424 have a first segment attribute associated therewith. In embodiments, the first segment attribute may be an indication of a memory segment having a modified file backup or a memory segment not having a file backup (i.e., an absence of a file backup).

In embodiments, attribute finder 212 may determine segment attributes of a segment via an API of API component 220 that exposes memory manager 224, as described in further detail herein. For instance, nodes of a VAD tree associated with memory segments 424 may be accessed through memory manager 224 by attribute finder 212 to determine whether ones of memory segments 424 have the first segment attribute. A memory segment of memory segments 424 having the first segment attribute is added to the first set of memory segments.

In step 306, memory segments of the first set are determined as also having a second segment attribute to determine a second set of memory segments. For instance, attribute finder 212 of FIG. 2 may be configured to determine if given memory segments of memory segments 424 that are added to the first set also have a second segment attribute associated therewith. In embodiments, the second segment attribute may be a private type attribute, or may be an image type attribute.

In embodiments, as similarly noted above for step 304, attribute finder 212 may determine segment attributes of a segment via an API of API component 220 that exposes memory manager 224, e.g., via nodes of a VAD tree, as described in further detail herein. A memory segment of the first set that also has the second segment attribute is added to the second set of memory segments.

In step 308, an indication is provided to enable the second set of memory segments to be scanned for malware code instead of scanning the plurality of memory segments for malware code. For instance, indication provider 216 of FIG. 2 may be configured to provide the indication. In embodiments, the indication may include identification and/or location (e.g., address) information for memory segments in the second set of memory segments. The indication may be provided to a user, to an administrator, and/or to anti-malware application 228, to enable the receiver of the indication to scan the second set of memory segments for malware code, rather than all of memory segments 408.

By one or more of step 304 and/or step 306 described above, candidate memory segments for anti-malware scans are reduced based on memory attributes. Additionally, each of step 304 and/or step 306 described above may incrementally provide smaller sizes of sets of memory segments on which a next step is performed. As virtual memories are susceptible to injectable malware code and have capacities that exceed several TB in size which support thousands of memory segments, the techniques and embodiments herein significantly reduce the use of system processing and memory usage for anti-malware scans. The reduction in scan candidates also improves overall system efficiency by freeing processor and memory resources for other processes and applications of the system. In some cases, thousands of possible memory segments may be reduced to as few as 1, 2, or 3 final candidate segments to be scanned by anti-malware applications, such as anti-malware application 228.

As an illustrative, non-limiting example scenario for purposes of discussion, consider virtual memory 410 of FIG. 4. As previously noted, virtual memory 410 includes a plurality (e.g., hundreds to tens of thousands) of memory segments 424. Memory segment 418 and memory segment 420 are loaded from storage 426, but memory segment 422 is not loaded from storage 426 and thus does not have a file backup. In step 302 of flowchart 300 with respect to this example scenario, virtual memory 410 is searched by segment scanner 210 to locate the memory segments of memory segments 424 that are initial candidate memory segments for determinations of segment attributes. Then in step 304, attribute finder 212 determines that memory segment 422 does not have a file backup (i.e., is a private type). Accordingly, memory segment 422 is included in the first set because of the presence of a first segment attribute. Additionally, while memory segment 418 has a file backup, attribute finder 212 determines that this memory segment has been modified (i.e., is an image type), and therefore, memory segment 418 is also included in the first set because of the presence of a first segment attribute.

Continuing this example scenario, in step 306, attribute finder 212 may determine whether or not memory segments in the first set have second segment attributes. For instance, it may be determined whether memory segment 422, if added to the first set, has an execute protection attribute (e.g., a second attribute), and if so, memory segment 422 is then added to the second set, but if not, memory segment 422 is not added. Attribute finder 212 may also determine whether or not memory segment 418, if added to the first set, has a shared attribute (e.g., a second attribute). If so, memory segment 418 is added to the second set, and if not, memory segment 418 is not added. According to embodiments, memory segment 422 and/or memory segment 418, if in the first or second sets, may be indicated as provided for in step 308.

As noted above, systems and devices may be configured in various ways to perform their respective functions according to the techniques described herein. In embodiments, the determination of segment attributes may be performed sequentially by segment (e.g., for a given segment determine first attributes, then second attributes, then third attributes, and repeat for other segments) as shown in FIG. 5 (described below), while in other embodiments, the determination of segment attributes may be performed sequentially by attribute (e.g., determine first attributes, then second attributes, then third attributes for each potential candidate segment) as shown in FIG. 6 (described below), while still in other embodiments, the determination of segment attributes may be performed in parallel.

Figure 5:
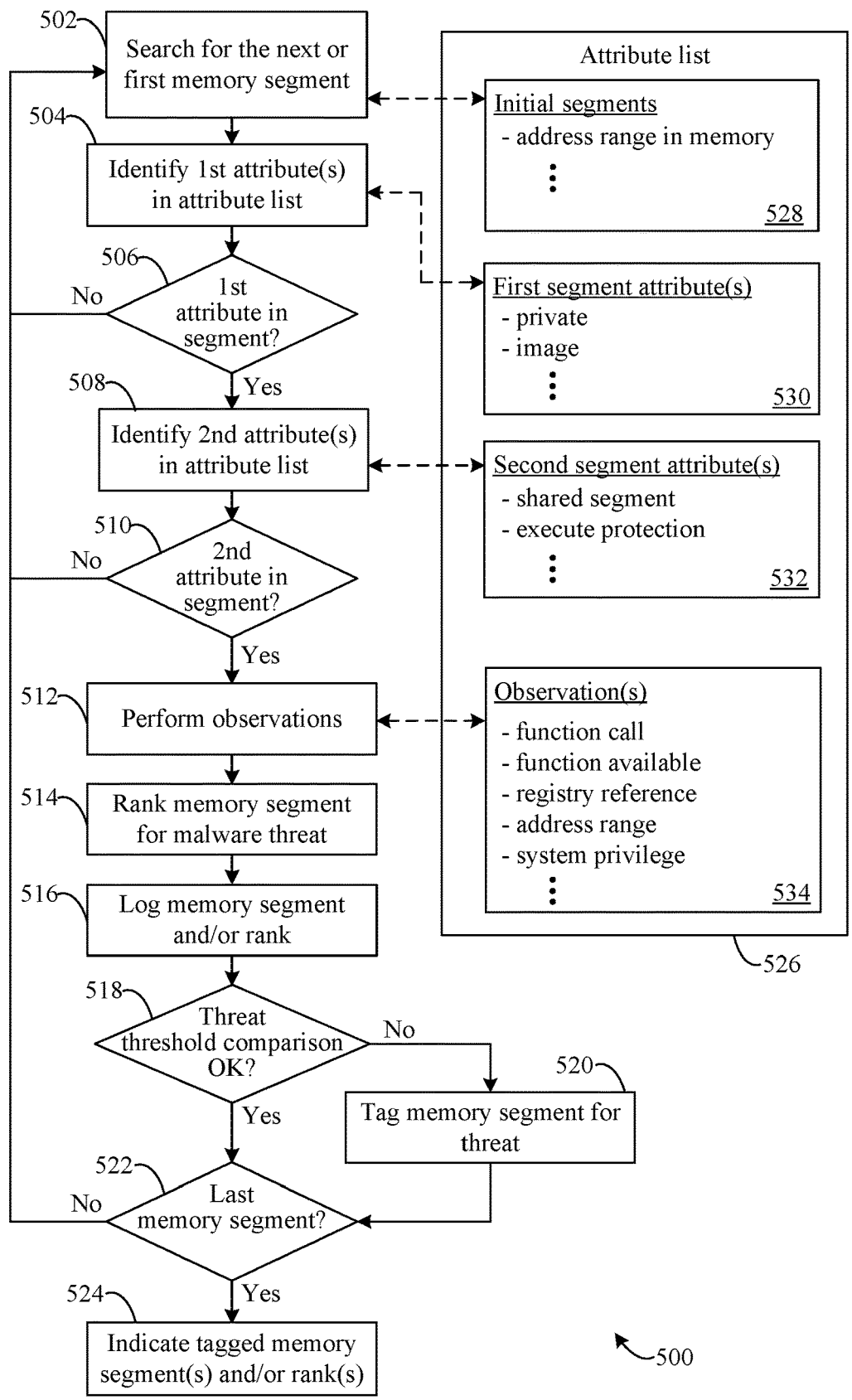
FIG. 5 shows a flow diagram for accelerated code injection detection using operating system controlled memory attributes, according to an example embodiment.
Figure 6:
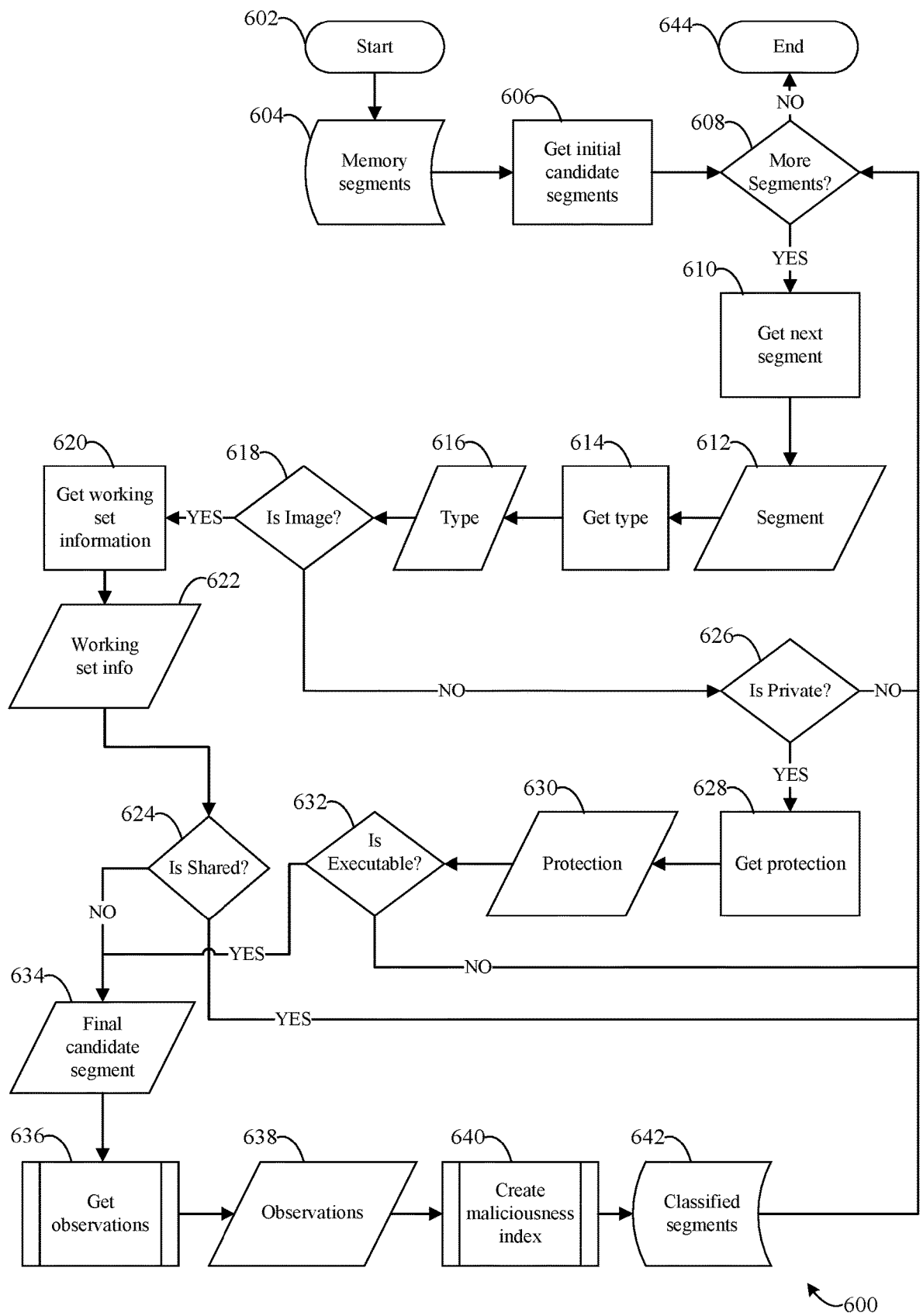
FIG. 6 shows a flow diagram for accelerated code injection detection using operating system controlled memory attributes, according to an example embodiment.

In FIG. 5, a flow diagram 500 for accelerated code injection detection using operating system controlled memory attributes is shown, according to an example embodiment. For purposes of illustration, flow diagram 500 of FIG. 5 is described with respect to system 200 of FIG. 2 and its subcomponents, and also with reference to FIG. 4. That is, system 200 of FIG. 2 may perform various functions and operations in accordance with flow diagram 500 for malware detection. Flow diagram 500 may be a further embodiment of flowchart 300 of FIG. 3. Further structural and operational examples will be apparent to persons skilled in the relevant art(s) based on the following description. Flow diagram 500 is described as follows.

Flow diagram 500 may utilize an attribute list 526 according to embodiments. Attribute list 526 may be a further embodiment of attribute list 226 of FIG. 2, and may include initial segment criteria 528, first segment attributes 530, second segment attributes 532, and/or observations 534, as similarly described above for attribute list 226. Flow diagram 500 may be invoked and/or performed automatically and periodically by a system such as system 200, based on detected activities within the system and/or other related systems (e.g., systems sharing or communicatively coupled via a network as shown in FIG. 1), based on an input from a user and/or administrator of the system, and/or the like.

In step 502, segment scanner 210 of FIG. 2 searches for the next or first memory segment. That is segment scanner 210 locates and/or identifies a first or next memory segment (e.g., one of memory segments 424 shown in FIG. 4) in the memory that will be checked for segment attributes by attribute finder 212 to determine if the memory segment has a first attribute based on first segment attributes 530. Segment scanner 210 may locate (or identify) such memory segments as being initial candidates by determining that these memory segments are in a range of memory that is not allocated to a system kernel, according to embodiments. When a memory segment is determined to be an initial candidate, attribute finder 212 identifies first attributes from first segment attributes 530 in step 504, and determines if the memory segment from step 502 has a first attribute in step 506. As noted herein, the first attribute may be, without limitation, an attribute for a private type memory segment or an attribute for an image type memory segment.

If a first attribute is present in the memory segment from step 502, the flow proceeds to step 508, and if not, the flow returns to step 502 to search for the next candidate memory segment.

In step 508, attribute finder 212 identifies second attributes from second segment attributes 532, and determines if the memory segment determined to have the first attribute in step 506 also has a second attribute based on second segment attributes 532 in step 510. As noted herein, the second attribute may be, without limitation, a shared segment attribute or an execute protection attribute.

If a second attribute is present in the memory segment from step 506, the flow proceeds from step 510 to step 512, and if not, the flow returns to step 502 to search for the next candidate memory segment.

In step 512, observations are performed on the memory segment determined to have a second attribute in step 510. Observations may be performed by attribute finder 212 and/or ranking provider 214 of FIG. 2, and any number of observations to be made may be selected or determined from observations 534. Observations may include, without limitation, function calls made from memory segments, functions available for calls from memory segments, registry references from memory segments, address ranges or instructions/code present and/or modified in memory segments, system privileges for memory segments, and/or the like.

For a memory segment determined to include a second attribute in step 510, and based on any combination of the first attribute, the second attribute, and/or the observations described herein, the memory segment is ranked with a ranking value or ranking level for a malware threat in step 514. Ranking provider 214 of FIG. 2 is configured to determine and/or provide rankings for such memory segments. Rankings may comprise numerical or descriptive indicators related to malware threat values/levels, e.g., 1 (benign), 2 (informational notice), 3 (suspicious), 4 (threat), and/or the like. Any number of ranking levels may be used, and rankings may be based on a low-to-high scale as shown here, or based on a high-to-low scale, according to embodiments.

A ranked segment from step 514 may be logged or stored in step 516, in embodiments. In some embodiments, a segment with a certain ranking level may not be logged (e.g., for benign rankings). Ranking provider 214 of FIG. 2 is configured to log or store information and/or identification information for memory segments ranked according to step 514. For example, the threat level may be stored along with a memory segment identifier, an address range, observations and/or attributes, etc. As the log is updated by ranking provider 214, a user or administrator may be enabled to view the log and take any appropriate action for memory segments therein, such as but not limited to, executing an anti-malware application such as anti-malware application 228, investigating logged memory segments for suspicious activity, noting false-positive logs, removing informational notice and benign memory segments that were logged and/or memory segments that have been scanned by an anti-malware application 228, and/or the like.

In step 518, ranking provider 214 of FIG. 2 is configured to compare memory segments (e.g., ranked in step 514 and/or logged in step 516) to a threat threshold to determine if a memory segment is to be tagged as a potential threat in step 520 by ranking provider 214. Threat thresholds may be set by users or administrators of systems, or may be predetermined or set to default values. Comparisons of ranking values/levels for memory segments to threat thresholds may be based on less than, less than or equal to, equal to, greater than or equal to, or greater than criteria, according to embodiments. If a comparison of a ranking level for a memory segment to the threat threshold, as configured, passes the configured criteria, the flow continues to step 522 where segment scanner 210 of FIG. 2 is configured to determine if the compared memory segment is the last candidate memory segment. If the comparison of step 518 fails, the flow proceeds first to step 520 where the memory segment is tagged as a potential malware threat by ranking provider 214 before step 522 is performed.

In step 522, segment scanner 210 of FIG. 2 is configured to determine if the compared memory segment is the last candidate memory segment. If it is determined that the last candidate memory segment has not been located and processed, the flow returns to step 502.

If it is determined that the last candidate memory segment has been located and processed, indication provider 228 is configured to provide an indication for any ranked, logged, and/or tagged memory segments in step 524 before the flow diagram ends. Indication provider 228 is configured to provide the indication as similarly described above with respect to step 308 of FIG. 3. Indications may comprise, in any combination and without limitation, any segment attribute(s), any segment observation(s), a segment identifier, a segment ranking and/or potential threat level, the threat threshold level setting, a segment tag, a timestamp, a process (es) associated with the memory segment, recommended actions, and/or the like. Indications may be provided to a user or an administrator in order to take any appropriate action for indicated memory segments, and/or may be provided to an anti-malware application such as anti-malware application 228 to perform a scan for indicated memory segments. In embodiments, indication provider 228, or another component of system 200 of FIG. 2 may be configured to invoke an anti-malware application for execution prior to, concurrently with, or responsive to providing the indication and enable the anti-malware application to scan the indicated memory segments instead of all memory segments in the memory.

Variations on flow diagram 500 are also contemplated herein. For example, in embodiments, flow diagram 500 may proceed from step 506 subsequent to a determination that the memory segment includes the first attribute to step 512 or to step 514. As another example, in embodiments, flow diagram 500 may be performed for different memory segments concurrently. As yet another example, in embodiments, flow diagram 500 may perform step 524 for a given memory segment while step 502 is performed concurrently for the next memory segment in the memory.

In FIG. 6, a flow diagram 600 for accelerated code injection detection using operating system controlled memory attributes is shown, according to an example embodiment. For purposes of illustration, flow diagram 600 of FIG. 6 is described with respect to system 200 of FIG. 2 and its subcomponents, and also with reference to memory system 400 FIG. 4. That is, system 200 of FIG. 2 may perform various functions and operations in accordance with flow diagram 600 for malware detection. Flow diagram 600 may be a further embodiment of flowchart 300 of FIG. 3. Further structural and operational examples will be apparent to persons skilled in the relevant art(s) based on the following description. Flow diagram 600 is described as follows.

Flow diagram 600 begins at step 602. For instance, flow diagram 600 may be invoked and/or performed automatically and periodically by a system such as system 200, based on detected activities within the system and/or other related systems (e.g., systems sharing or communicatively coupled via a network as shown in FIG. 1), based on an input from a user and/or administrator of the system, and/or the like.

In step 604, segment scanner 210 of FIG. 2 searches for memory segments. That is, segment scanner 210 locates and/or identifies a memory segment (e.g., one of memory segments 424 shown in FIG. 4).

In step 606, attribute finder 212 determines if the memory segments from step 604 are initial candidate segments. As described herein, the determination may be based on address ranges in memory for memory segments listed in an attribute list. For flow diagram 600, an attribute list such as attribute list 526 of FIG. 5 may be utilized, according to embodiments. As noted above, a memory segment may be an initial candidate if it resides in an address range of the memory that is not allocated to a system kernel. Memory segments found as being initial candidates may be added to a first set of memory segments, and may be referred to as a set of initial candidate memory segments.

In step 608, a determination is made as to whether each, if any, of the memory segments assigned to the first set in step 606 have been processed. If all the memory segments assigned to the first set have been processed, or if the first set is empty, flow diagram 600 ends at step 644. If there are memory segments assigned to the first set that have hot been processed, processing for flow diagram 600 proceeds to step 610.

In step 610, the next segment (or first segment) in the first set of memory segments (e.g., the initial candidate memory segments) is determined. A memory segment 612 that is the next memory segment is processed by attribute finder 212 to determine a first segment attribute in step 614, such as a segment type 616. When segment type 616 is identified, at 618 attribute finder 212 determines if segment type 616 is an image type. If so, memory segment 612 may be added to a second set of memory segments and flow diagram 600 proceeds to step 620 where working set information is determined by attribute finder 212, e.g., via an API of API component 220 of FIG. 2 that allows for physical page queries to determine working set information 622. Based on working set information 622, attribute finder 212 determines if memory segment 612 is shared at step 624 (i.e., a determination of whether the segment has been modified). A shared attribute may be a second segment attribute, and may indicate a true or false value for the attribute, according to embodiments. If the segment is shared at step 624 (true), flow diagram 600 returns to step 608, and if not shared (false), flow diagram 600 continues to step 634 where memory segment 612 may be added to a third set of memory segments.

From step 618, if memory segment 612 is not an image type, flow diagram 600 proceeds to step 626 where attribute finder 212 determines if memory segment 612 is private. A private attribute may also be a first segment attribute, according to embodiments. If memory segment 612 is not private, flow diagram 600 returns to step 608. If memory segment 612 is private, memory segment 612 may be added to the second set of memory segments and flow diagram 600 continues to step 628 where attribute finder 212 determines a protection attribute 630 for memory segment 612. If protection attribute 630 is determined in step 632 as indicating an executable memory segment (i.e., protection attribute 630 indicates execute protection), flow diagram 600 continues to step 634 where memory segment 612 may be added to third set of memory segments. If memory segment 612 does not have protection attribute 630 that indicates execute protection, flow diagram 600 returns to step 608. In embodiments, protection attribute 630 (e.g., execute protection) may be a second segment attribute.

The third set of memory segments may be a set of final candidate memory segments according to embodiments. A memory segment, such as memory segment 612, that is a final candidate memory segment in step 634 is analyzed/processed for one or more observations at step 636. Observations may be performed by attribute finder 212 and/or ranking provider 214 of FIG. 2, and any number of observations may be made as described herein. Determined observations 638 may include, without limitation, function calls made from memory segments, functions available for calls from memory segments, registry references from memory segments, address ranges or instructions/code present and/or modified in memory segments, system privileges for memory segments, and/or the like. Observations 638 for a memory segment determined to be a final candidate memory segment in step 634, a maliciousness index or ranking may be determined in step 640 by ranking provider 214 of FIG. 2. The maliciousness index or ranking may be based on any combination of first attributes, second attributes, and/or observations 638 described herein, and indices/rankings may comprise numerical or descriptive indicators related to malware threat levels, as noted above.

When indexed or ranked in step 640, a memory segment from step 514 may be classified according to its index/rank to generate classified segments 642 by ranking provider 214, and classified segments 642 may be logged or stored, in embodiments. In some embodiments, a segment with a certain index or ranking level may not be logged (e.g., for benign rankings). For example, the threat level may be stored along with a memory segment identifier, an address range, observations and/or attributes, etc., as described herein. Users or administrators may be enabled to view classified segments 642 that are logged and thus be enabled to take any appropriate action for classified segments 642, such as but not limited to, executing an anti-malware application such as anti-malware application 228 of FIG. 2, investigating memory segments for suspicious activity, noting false-positive logs, removing informational notice and benign memory segments that were logged and/or memory segments that have been scanned by an anti-malware application 228, and/or the like.

As described herein, ranking provider 214 of FIG. 2 may be configured to compare memory segments to a threat threshold to determine if a memory segment is to be included in classified segments 642.

In embodiments, indication provider 228 of FIG. 2 may be configured to provide an indication for any of classified segments 642. Indication provider 228 is configured to provide the indication as similarly described above with respect to step 308 of FIG. 3 and/or step 524 of FIG. 5, and indications may be provided to a user or an administrator in order to take any appropriate action for indicated memory segments and/or may be provided to an anti-malware application such as anti-malware application 228 to perform a scan for indicated memory segments. In embodiments, indication provider 228, or another component of system 200 of FIG. 2 may be configured to invoke an anti-malware application for execution prior to, concurrently with, or responsive to providing the indication and enable the anti-malware application to scan the indicated memory segments instead of all memory segments in the memory.

Variations on flow diagram 600 are also contemplated herein. For example, in embodiments, flow diagram 600 may proceed from step 618 or from step 626 to step 634 rather than step 620 or step 630, respectively. As another example, in embodiments, various steps for flow diagram 600 may be performed for different memory segments concurrently.

Figure 7:
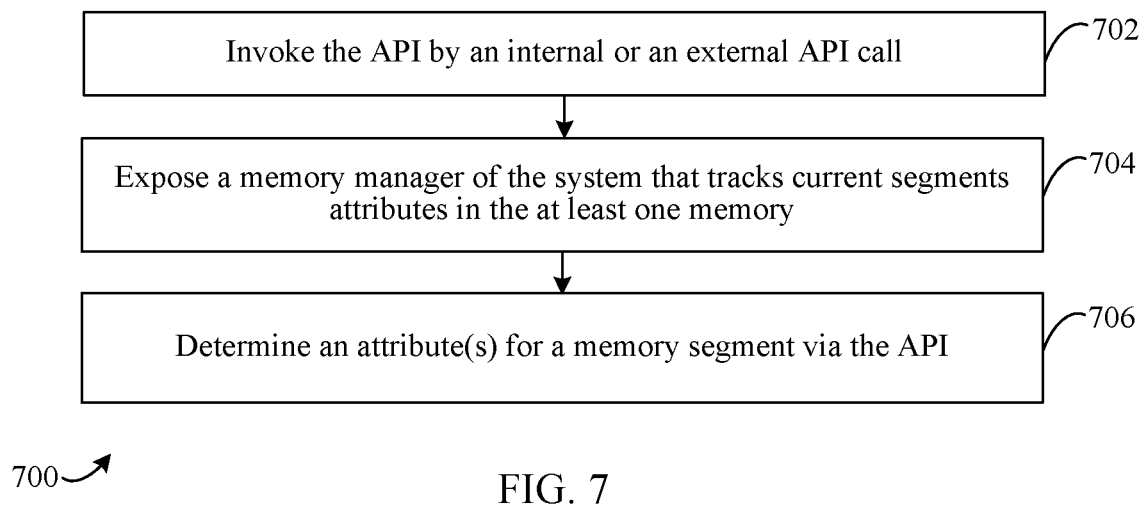
FIG. 7 shows a flowchart for accelerated code injection detection using operating system controlled memory attributes, according to an example embodiment.

Referring now to FIG. 7, a flowchart 700 for accelerated code injection detection using operating system controlled memory attributes is shown, according to an example embodiment. For purposes of illustration, flowchart 700 of FIG. 7 is described with respect to system 200 of FIG. 2 and its subcomponents, and also with reference to memory system 400 of FIG. 4. That is, system 200 of FIG. 2 may perform various functions and operations in accordance with flowchart 700 for accelerated code injection detection using operating system controlled memory attributes. In embodiments, flowchart 700 may be a further embodiment of flowchart 300 of FIG. 3. Further structural and operational examples will be apparent to persons skilled in the relevant art(s) based on the following description. Flowchart 700 is described as follows.

In step 702, an API is invoked by an internal or an external API call. For example, an API of API component 220 of FIG. 2 may be invoked by malware detector 208, including one or more components thereof. In an embodiment, for example, attribute finder 212 may invoke the API during performance of its functions to determine memory segment attributes for a memory segment(s) of a memory, such as ones of virtual memory segments 424, as described herein. The API may also be invoked external to malware detector 208, such as by, without limitation, OS 222 or an anti-malware application like anti-malware application 228.

In step 704, a memory manager of the system that tracks current segments attributes in the at least one memory is exposed. For instance, the API invoked in step 702 may be configured to expose memory manager 224 of OS 222 in FIG. 2 to malware detector 208, including one or more components thereof, such as but not limited to, attribute finder 212. Accordingly, access to information of memory manager 224 is accessible to perform the techniques described herein.

In step 706, an attribute(s) for a memory segment is determined via the API. For example, attribute finder 212 may be configured to determine segment attributes for a memory segment, e.g., virtual memory segments 424, via the API. As noted in step 704, memory manager 224 may be exposed to attribute finder 212, and thus, attribute finder 212 determines segment attributes, as described herein, via the API.

Figure 8:
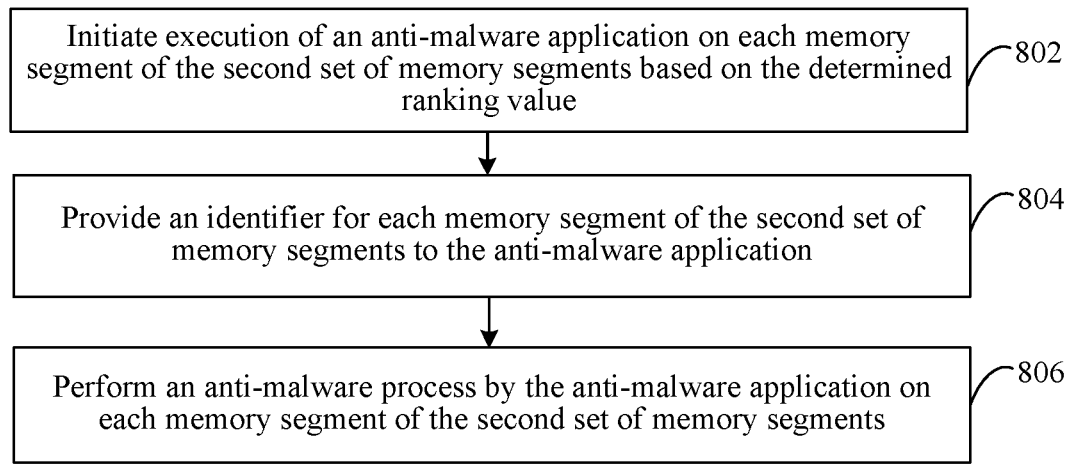
FIG. 8 shows a flowchart for accelerated code injection detection using operating system controlled memory attributes, according to an example embodiment.

In FIG. 8, a flowchart 800 for accelerated code injection detection using operating system controlled memory attributes is shown, according to an example embodiment. For purposes of illustration, flowchart 800 of FIG. 8 is described with respect to system 200 of FIG. 2 and its subcomponents, and also with reference to memory system 400 of FIG. 4. That is, system 200 of FIG. 2 may perform various functions and operations in accordance with flowchart 800 for accelerated code injection detection using operating system controlled memory attributes. In embodiments, flowchart 800 may be a further embodiment of flowchart 300 of FIG. 3, e.g., step 308. Further structural and operational examples will be apparent to persons skilled in the relevant art(s) based on the following description. Flowchart 800 is described as follows.

In step 802, execution of an anti-malware application on each memory segment of the second set of memory segments is initiated based on the determined ranking value. For instance, as described herein, indication provider 228 of FIG. 2, or another component of system 200 of FIG. 2, may be configured to automatically invoke or initiate an anti-malware application such as anti-malware application 228 for execution prior to, concurrently with, or responsive to providing the indication and enable the anti-malware application to scan the indicated memory segments instead of all memory segments in the memory. That is, the indications provided herein, according to embodiments, may be based on determined ranking values or levels for memory segments. Additionally, indications signifying a memory segment with a potential malware threat based on a compared threat threshold, may cause the invocation of the anti-malware application and/or a scan therefrom.

In step 804, an identifier is provided for each memory segment of the second set of memory segments to the anti-malware application. For example, indication provider 216 of FIG. 2 may be configured to automatically provide identifier information for memory segments that are to be scanned for malware presence to an anti-malware application to enable the anti-malware application to scan the identified memory segment(s). In some embodiments, a user or administrator of a system may provide identifier information for memory segments needing to be scanned by an anti-malware application based on an indication from indication provider 216.

In step 806, an anti-malware process is performed by the anti-malware application on each memory segment of the second set of memory segments. For instance, as anti-malware application 228 is configured to perform an anti-malware scan and/or correction (i.e., anti-malware processes) on memory segments indicated and/or identified in step 802 and/or step 804.

It should be appreciated that in some embodiments, memory segments in a third set of memory segments, as described herein, may also be used in performance of flowchart 800.

Figure 9:
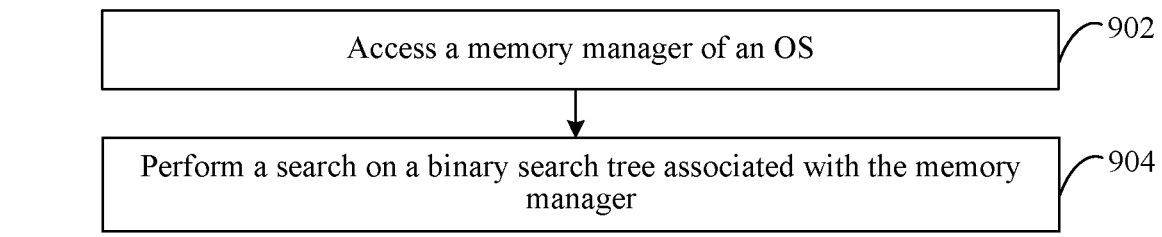
FIG. 9 shows a flowchart for accelerated code injection detection using operating system controlled memory attributes, according to an example embodiment.

In FIG. 9, a flowchart 900 for accelerated code injection detection using operating system controlled memory attributes is shown, according to an example embodiment. For purposes of illustration, flowchart 900 of FIG. 9 is described with respect to system 200 of FIG. 2 and its subcomponents, and also with reference to memory system 400 of FIG. 4. That is, system 200 of FIG. 2 may perform various functions and operations in accordance with flowchart 900 for accelerated code injection detection using operating system controlled memory attributes. In embodiments, flowchart 900 may be a further embodiment of flowchart 300 of FIG. 3, e.g., step 302. Further structural and operational examples will be apparent to persons skilled in the relevant art(s) based on the following description. Flowchart 900 is described as follows.

In step 902, a memory manager of an OS is accessed. For example, memory manager 224 of OS 222 of FIG. 2 may be accessed. In embodiments, as described herein, the access may be performed via an API of API component 220 by one or more portions of malware detector 208, e.g., segment scanner 210.

In step 904, a search is performed on a binary search tree associated with the memory manager. For instance, memory manager 224 of OS 222 of FIG. 2 may include a VAD tree configured as a binary search tree that may be searched by segment scanner 210 to locate and/or identify memory segments, e.g., virtual memory segments 424, according to the embodiments herein.

III. Example Processor-Based Computer System Implementation

As noted herein, the embodiments and techniques described herein, including malware detector 108, malware detector 112a, malware detector 112b, malware detector 208, segment scanner 210, attribute finder 212, ranking provider 214, indication provider 216, API 220, anti-malware application 228, flowchart 300, flowchart 500, flowchart 600, flowchart 700, flowchart 800, and/or flowchart 900 may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), or an application specific integrated circuit (ASIC).

Figure 10:
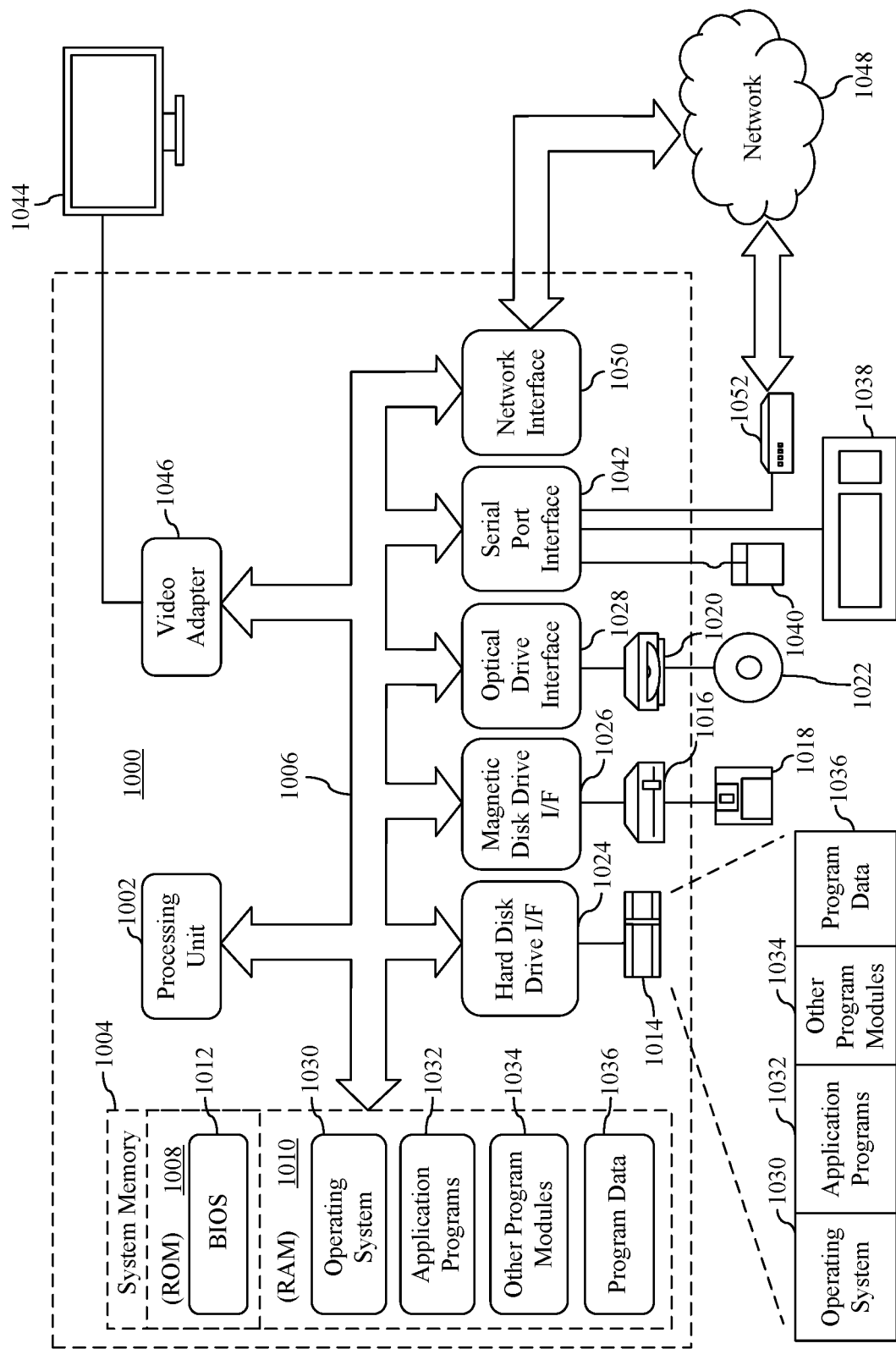
FIG. 10 shows a block diagram of an example processor-based computer system that may be used to implement various example embodiments.

FIG. 10 depicts an example processor-based computer system 1000 that may be used to implement various example embodiments described herein. For example, system 1000 may be used to implement any server, host, system, device (e.g., a remote device), mobile/personal device, etc., as described herein. System 1000 may also be used to implement any of the steps of any of the flowcharts, as described herein. The description of system 1000 provided herein is provided for purposes of illustration, and is not intended to be limiting. Embodiments may be implemented in further types of computer systems, as would be known to persons skilled in the relevant art(s).

As shown in FIG. 10, computing device 1000 includes one or more processors, referred to as processor circuit 1002, a system memory 1004, and a bus 1006 that couples various system components including system memory 1004 to processor circuit 1002. Processor circuit 1002 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1002 may execute program code stored in a computer readable medium, such as program code of operating system 1030, application programs 1032, other programs 1034, etc. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random access memory (RAM) 1010. A basic input/output system 1012 (BIOS) is stored in ROM 1008.

Computing device 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1030, one or more application programs 1032, other programs 1034, and program data 1036. Application programs 1032 or other programs 1034 may include, for example, computer program logic (e.g., computer program code or instructions) for implementing malware detector 108, malware detector 112a, malware detector 112b, malware detector 208, segment scanner 210, attribute finder 212, ranking provider 214, indication provider 216, API 220, anti-malware application 228, flowchart 300, flowchart 500, flowchart 600, flowchart 700, flowchart 800, and/or flowchart 900 (including any suitable step of flowcharts 300, 500, 600, 700, 800, 900), and/or further embodiments described herein.

A user may enter commands and information into the computing device 1000 through input devices such as keyboard 1038 and pointing device 1040. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1002 through a serial port interface 1042 that is coupled to bus 1006, but may be connected by other interfaces, such as a parallel port, game port, or a universal serial bus (USB).

A display screen 1044 is also connected to bus 1006 via an interface, such as a video adapter 1046. Display screen 1044 may be external to, or incorporated in computing device 1000. Display screen 1044 may display information, as well as being a user interface for receiving user commands and/or other information (e.g., by touch, finger gestures, virtual keyboard, etc.). In addition to display screen 1044, computing device 1000 may include other peripheral output devices (not shown) such as speakers and printers.

Computing device 1000 is connected to a network 1048 (e.g., the Internet) through an adaptor or network interface 1050, a modem 1052, or other means for establishing communications over the network. Modem 1052, which may be internal or external, may be connected to bus 1006 via serial port interface 1042, as shown in FIG. 10, or may be connected to bus 1006 using another interface type, including a parallel interface.

As used herein, the terms "computer program medium," "computer-readable medium," and "computer-readable storage medium" are used to refer to physical hardware media such as the hard disk associated with hard disk drive 1014, removable magnetic disk 1018, removable optical disk 1022, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1032 and other programs 1034) may be stored on the hard disk, magnetic disk, optical disk, ROM, RAM, or other hardware storage medium. Such computer programs may also be received via network interface 1050, serial port interface 1042, or any other interface type. Such computer programs, when executed or loaded by an application, enable computing device 1000 to implement features of embodiments discussed herein. Accordingly, such computer programs represent controllers of the computing device 1000.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Example Advantages and Embodiments

As described, systems and devices embodying the techniques herein may be configured in various ways to perform their respective functions. In embodiments, one or more of the steps or operations of any flowchart described herein may not be performed. Moreover, steps or operations in addition to or in lieu of those in any flowchart described herein may be performed. Further, in examples, one or more operations of any flowchart described herein may be performed out of order, in an alternate sequence, or partially (or completely) concurrently with each other or with other operations.

The embodiments and techniques described herein provide improved performance of computing devices and operations executing thereon for accelerated code injection detection using operating system controlled memory attributes. For instance, the described embodiments and techniques provide for increased system and device efficiency, e.g., improved searching and identification of memory segments that are candidates for malware scanning, as described herein. For example, the described embodiments and techniques allow for reducing tens of thousands of memory segments to as few as 1, 2, or 3 final candidate memory segments for malware scanning. Accordingly, fewer processing cycles and resources are required by the system in performing anti-malware operations, and system memory and virtual memory space for malware searches and correction is thus freed more quickly because searches are more efficient, thus reducing the required memory footprint and memory segment candidate identification. The described embodiments and techniques also provide for improved computer and data security by allowing improved and more efficient identification and removal of malware, e.g., injectable malware code, specifically from memories of computing devices.

The additional examples described in this Section may be applicable to examples disclosed in any other Section or subsection of this disclosure.

A method is described herein. The method may be for accelerated code injection detection using operating system controlled memory attributes as performed by a computing system. The method includes searching a memory to locate a plurality of memory segments, and determining memory segments of the located plurality of memory segments having a predetermined plurality of segment attributes to determine a set of memory segments that contains fewer memory segments than the plurality of memory segments. The method also includes providing an indication to enable the set of memory segments to be scanned for malware code instead of scanning the plurality of memory segments for malware code.

In an embodiment of the method, a first segment attribute of the predetermined plurality of segment attributes includes at least one of a private type attribute or an image type attribute.

In an embodiment of the method, a second segment attribute of the predetermined plurality of segment attributes includes at least one of an execute protection attribute or a shared segment attribute.

In an embodiment, the method includes determining a ranking value for at least one memory segment of the set of memory segments based on at least one of the predetermined plurality of segment attributes or one or more observations for the at least one memory segment comprising a function call, a function available to call, a registry reference, an address range, or a system privilege.

In an embodiment, the method includes initiating execution of an anti-malware application on each memory segment of the set of memory segments based on the determined ranking value, and providing an identifier for each memory segment of the set of memory segments to the anti-malware application for performance of an anti-malware process by the anti-malware application on each memory segment of the set of memory segments.

In an embodiment, the method includes, for each memory segment of the set of memory segments, performing at least one of including the ranking value in the indication or comparing the ranking value to a threat threshold value and providing the indication based on said comparing.

In an embodiment, the method includes retrieving a stored attribute list that is configured to be dynamically updated, and that includes listed attributes corresponding to the predetermined plurality of segment attributes, and determining whether the memory segments of the located plurality of memory segments have the predetermined plurality of segment attributes is performed via an application programming interface (API) configured to expose a memory manager that tracks current segment attributes for the memory.

A system is also described herein. The system may be for accelerated code injection detection using operating system controlled memory attributes. The system includes at least one memory configurable to define a plurality of memory segments, and configured to store instructions associated with processes executing on the system, and program logic for malware search and detection. The system also includes at least one processor configured to access the memory and to execute the program logic. The program logic includes search logic configured to search the at least one memory to locate memory segments. The system also includes attribute logic configured to determine memory segments of the located plurality of memory segments having a first segment attribute to determine a first set of memory segments, and determine memory segments of the first set that also have a second segment attribute to determine a second set of memory segments. The system also includes indication logic configured to provide an indication to enable the second set of memory segments to be scanned for malware code instead of scanning the plurality of memory segments for malware code.

In an embodiment of the system, the first segment attribute comprises at least one of a private type attribute, or an image type attribute, and the second segment attribute comprises at least one of an execute protection attribute, or a shared segment attribute.

In an embodiment of the system, the at least one memory comprises a system memory configured to store ones of the instructions for access by the processes executing on the system, and a virtual memory configured with the memory segments.

In an embodiment of the system, the program logic further comprises ranking logic configured to determine a ranking value: for one or more memory segments of the first set of memory segments based on the first segment attribute, or for one or more memory segments of the second set of memory segments based on the second segment attribute. In a further embodiment of the system, for the one or more memory segments of the first set of memory segments or for the one or more memory segments of the second set of memory segments, the indication logic is configured to perform at least one of including the ranking value in the indication, or comparing the ranking value to a threat threshold value and providing the indication based on said comparing.

In an embodiment of the system, the attribute logic is configured to perform one or more observations for memory segments of the first set of memory segments or the second set of memory segments, the observations including at least one of a function call, a registry reference, an address range for modified data, or a system privilege. In the embodiment, the ranking value is also based on the one or more observations.

In an embodiment of the system, the at least one memory stores an attribute list that is configured to be dynamically updated, and to include listed attributes corresponding to the first segment attribute and to the second segment attribute, and the attribute logic is configured to determine whether a memory segment has at least one of the first segment attribute or the second segment attribute based on the listed attributes.

In an embodiment of the system, the attribute logic is configured to determine whether a memory segment has at least one of the first segment attribute or the second segment attribute via an application programming interface (API) configured to expose a memory manager of the system that tracks current segment attributes in the at least one memory.

In an embodiment of the system, the search logic is configured to access the memory manager, and perform the search on a binary search tree associated with the memory manager.

A computer-readable program storage device having computer program instructions recorded thereon that, when executed by a processing device, perform a method for malware detection, is also described herein. The method may be for accelerated code injection detection using operating system controlled memory attributes. The program instructions include search instructions configured to search a memory of a system, and locate memory segments of the memory. The program instructions also include attribute instructions configured to determine memory segments of the located memory segments having a predetermined plurality of segment attributes to determine a set of memory segments that contains fewer memory segments than the located memory segments. The program instructions also include indication instructions configured to provide an indication to enable the set of memory segments to be scanned for malware code instead of scanning the plurality of memory segments for malware code.

In an embodiment of the computer-readable program storage device, the attribute instructions are configured to invoke an application programming interface (API) configured to expose a memory manager of the system that tracks segment attributes in the memory, and determine whether the memory segment has the predetermined plurality of segment attributes via the memory manager using the API.

In an embodiment of the computer-readable program storage device, a first segment attribute of the predetermined plurality of segment attributes includes at least one of a private type attribute or an image type attribute, and a second segment attribute of the predetermined plurality of segment attributes includes at least one of an execute protection attribute or a shared segment attribute.

In an embodiment of the computer-readable program storage device, the attribute instructions are configured to perform observations for the set of memory segments. The observations include at least one of a function call made from the memory segment, a registry reference associated with the memory segment, an address range of the memory segment with modified data, or a system privilege associated with the memory segment.

V. Conclusion

While various examples of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described examples, but should be defined only in accordance with the following claims and their equivalents.

What is claimed is:

1. A method for malware detection implemented by a computing system, comprising:
   searching a volatile memory to locate a plurality of memory segments;
   determining memory segments of the located plurality of memory segments having a predetermined plurality of segment attributes to determine a set of memory segments that contains fewer memory segments than the plurality of memory segments; and
   providing an indication to enable the set of memory segments to be scanned for malware code in the volatile memory instead of scanning the plurality of memory segments for malware code.

2. The method of claim 1, wherein a first segment attribute of the predetermined plurality of segment attributes indicates at least one of:
   a private type attribute; or
   an image type attribute.

3. The method of claim 2, wherein a second segment attribute of the predetermined plurality of segment attributes comprises at least one of:
   an execute protection attribute; or
   a shared segment attribute.

4. The method of claim 1, further comprising
   determining a ranking value for at least one memory segment of the set of memory segments based on at least one of:

the predetermined plurality of segment attributes; or
one or more observations for the at least one memory segment comprising a function call, a function available to call, a registry reference, an address range, or a system privilege.

5. The method of claim 4, further comprising:
initiating execution of an anti-malware application on each memory segment of the set of memory segments based on the determined ranking value; and
providing an identifier for each memory segment of the set of memory segments to the anti-malware application for performance of an anti-malware process by the anti-malware application on each memory segment of the set of memory segments.

6. The method of claim 4, further comprising:
for each memory segment of the set of memory segments, performing at least one of:
including the ranking value in the indication; or
comparing the ranking value to a threat threshold value and providing the indication based on said comparing.

7. The method of claim 1, further comprising:
retrieving a stored attribute list that is configured to be dynamically updated, and that includes listed attributes corresponding to the predetermined plurality of segment attributes; and
wherein determining whether the memory segments of the located plurality of memory segments have the predetermined plurality of segment attributes is performed via an application programming interface (API) configured to expose a memory manager, that tracks current segment attributes for the volatile memory, to attribute finder logic configured to perform said determining memory segments of the located plurality of memory segments having a predetermined plurality of segment attributes.

8. A system comprising:
at least one volatile memory configurable to define a plurality of memory segments, the at least one volatile memory that stores:
instructions associated with processes executing on the system, and program logic for malware search and detection; and
at least one processor configured to access the at least one volatile memory and to execute the program logic, the program logic comprising:
search logic configured to:
search the at least one volatile memory to locate memory segments;
attribute logic configured to:
determine memory segments of the located plurality of memory segments having a first segment attribute to determine a first set of memory segments; and
determine memory segments of the first set that also have a second segment attribute to determine a second set of memory segments; and
indication logic configured to:
provide an indication to enable the second set of memory segments to be scanned for malware code in the volatile memory instead of scanning the plurality of memory segments for malware code.

9. The system of claim 8, wherein the first segment attribute indicates at least one of:
a private type attribute; or
an image type attribute; and
wherein the second segment attribute comprises at least one of:

an execute protection attribute; or
a shared segment attribute.

10. The system of claim 9, wherein the at least one volatile memory comprises:
a system memory configured to store ones of the instructions for access by the processes executing on the system; and
a virtual memory configured with the memory segments.

11. The system of claim 8, wherein the program logic further comprises ranking logic configured to determine a ranking value:
for one or more memory segments of the first set of memory segments based on the first segment attribute; or
for one or more memory segments of the second set of memory segments based on the second segment attribute.

12. The system of claim 11, wherein, for the one or more memory segments of the first set of memory segments or for the one or more memory segments of the second set of memory segments, the indication logic is configured to perform at least one of:
including the ranking value in the indication; or
comparing the ranking value to a threat threshold value and providing the indication based on said comparing.

13. The system of claim 12, wherein the attribute logic is configured to perform one or more observations for memory segments of the first set of memory segments or the second set of memory segments, the observations comprising at least one of a function call, a registry reference, an address range for modified data, or a system privilege; and
wherein the ranking value is also based on the one or more observations.

14. The system of claim 12, wherein the at least one volatile memory stores an attribute list that is configured to be dynamically updated, and to include listed attributes corresponding to the first segment attribute and to the second segment attribute; and
wherein the attribute logic is configured to determine whether a memory segment has at least one of the first segment attribute or the second segment attribute based on the listed attributes.

15. The system of claim 8, wherein the attribute logic is configured to determine whether a memory segment has at least one of the first segment attribute or the second segment attribute via an application programming interface (API) configured to expose to the attribute logic a memory manager of the system that tracks current segment attributes in the at least one volatile memory.

16. The system of claim 8, wherein the search logic is configured to:
access the memory manager; and
perform the search on a binary search tree associated with the memory manager.

17. A computer-readable program storage device having computer program instructions recorded thereon that, when executed by a processing device, perform a method for malware detection, the program instructions comprising:
search instructions configured to:
search a volatile memory of a system; and
locate memory segments of the volatile memory;
attribute instructions configured to:
determine memory segments of the located memory segments having a predetermined plurality of segment attributes to determine a set of memory segments that contains fewer memory segments than the located memory segments; and indication instructions configured to:
provide an indication to enable the set of memory segments to be scanned for malware code instead of scanning the plurality of memory segments for malware code.

18. The computer-readable program storage device of claim 17, wherein the attribute instructions are configured to:
invoke an application programming interface (API) configured to expose to the attribute instructions a memory manager of the system that tracks segment attributes in the volatile memory; and
determine whether the memory segment has the predetermined plurality of segment attributes via the memory manager using the API.

19. The computer-readable program storage device of claim 17, wherein a first segment attribute of the predetermined plurality of segment attributes indicates at least one of:
a private type attribute; or
an image type attribute; and
wherein a second segment attribute of the predetermined plurality of segment attributes comprises at least one of:
an execute protection attribute; or
a shared segment attribute.

20. The computer-readable program storage device of claim 19, wherein the attribute instructions are configured to perform observations for the set of memory segments, the observations including at least one of:
a function call made from the memory segment;
a registry reference associated with the memory segment;
an address range of the memory segment with modified data; or
a system privilege associated with the memory segment.

* * * * *